United States Patent
Okamoto et al.

(10) Patent No.: US 9,911,986 B2
(45) Date of Patent: Mar. 6, 2018

(54) APPARATUS AND METHOD FOR PRODUCING FUEL CELL SEPARATOR ASSEMBLY

(71) Applicant: Nissan Motor Co., Ltd., Yokohama-shi, Kanagawa (JP)

(72) Inventors: Naoki Okamoto, Tokyo (JP); Akira Shimizu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 52 days.

(21) Appl. No.: 14/787,439

(22) PCT Filed: Apr. 8, 2014

(86) PCT No.: PCT/JP2014/060221
§ 371 (c)(1),
(2) Date: Oct. 27, 2015

(87) PCT Pub. No.: WO2014/185193
PCT Pub. Date: Nov. 20, 2014

(65) Prior Publication Data
US 2016/0072135 A1    Mar. 10, 2016

(30) Foreign Application Priority Data

May 16, 2013  (JP) ................................. 2013-104421

(51) Int. Cl.
*H01M 8/02* (2016.01)
*H01M 8/0297* (2016.01)
(Continued)

(52) U.S. Cl.
CPC ....... *H01M 8/0297* (2013.01); *H01M 8/0206* (2013.01); *H01M 8/0228* (2013.01);
(Continued)

(58) Field of Classification Search
CPC combination set(s) only.
See application file for complete search history.

(56) References Cited

U.S. PATENT DOCUMENTS 6,372,373 B1 * 4/2002 Gyoten ............... H01M 8/0254
429/456
6,610,435 B1 * 8/2003 Maruyama .......... H01M 8/0271
429/437
(Continued)

FOREIGN PATENT DOCUMENTS

JP          11-97039 A      4/1999
JP       2006-228533 A      8/2006
(Continued)

*Primary Examiner* — Kaity Chandler
(74) *Attorney, Agent, or Firm* — Global IP Counselors, LLP

(57) ABSTRACT

A manufacturing method for manufacturing a fuel cell separator assembly includes a joining step for bringing opposing projections of uneven portions of separators into contact with each other through use of pressing members to join the projections through use of a welding robot. In the joining step, an elastic member is interposed between the pressing members and at least one of first and second separators so that a pressing force from the pressing members is imparted to the first and second separators. In this way, the opposing projections are brought into contact with each other by elastic deformation of the elastic member.

4 Claims, 7 Drawing Sheets

(51) Int. Cl.
*H01M 8/0206* (2016.01)
*H01M 8/0267* (2016.01)
*H01M 8/0228* (2016.01)
*H01M 8/0258* (2016.01)
*H01M 8/1018* (2016.01)
*B23K 37/04* (2006.01)
*B23K 31/02* (2006.01)

(52) U.S. Cl.
CPC ....... *H01M 8/0258* (2013.01); *H01M 8/0267* (2013.01); *B23K 31/02* (2013.01); *B23K 37/04* (2013.01); *H01M 2008/1095* (2013.01); *Y02P 70/56* (2015.11)

(56) References Cited

U.S. PATENT DOCUMENTS

| | | | | |
|---|---|---|---|---|
| 6,893,765 | B1* | 5/2005 | Nishida | H01M 8/0204 429/481 |
| 7,468,217 | B2* | 12/2008 | Mizuno | H01M 8/0265 429/434 |
| 2001/0028974 | A1* | 10/2001 | Nakata | H01M 8/0204 429/517 |
| 2004/0157100 | A1* | 8/2004 | Mizuno | H01M 8/0254 429/434 |
| 2004/0197633 | A1* | 10/2004 | Yamamoto | H01M 8/0226 429/434 |
| 2004/0258974 | A1* | 12/2004 | Tsuji | H01M 8/0247 429/456 |
| 2005/0158604 | A1* | 7/2005 | Wariishi | H01M 8/247 429/467 |
| 2007/0042261 | A1* | 2/2007 | Kohyama | H01M 8/0247 429/480 |
| 2007/0184327 | A1* | 8/2007 | Ishioka | H01M 8/0273 429/457 |
| 2008/0220312 | A1* | 9/2008 | Kato | H01M 8/0271 429/461 |
| 2008/0318101 | A1* | 12/2008 | Kim | H01M 8/04007 429/422 |
| 2009/0000732 | A1* | 1/2009 | Jacobine | H01M 8/0271 156/273.5 |
| 2009/0035643 | A1* | 2/2009 | Terada | H01M 8/021 429/483 |
| 2009/0092872 | A1 | 4/2009 | Miyazawa et al. | |
| 2009/0136805 | A1* | 5/2009 | Sato | H01M 8/0258 429/434 |
| 2009/0311571 | A1* | 12/2009 | Takahashi | H01M 8/1002 429/434 |
| 2010/0047650 | A1* | 2/2010 | Iino | H01M 8/0213 429/479 |
| 2011/0127239 | A1 | 6/2011 | Kunichi et al. | |

FOREIGN PATENT DOCUMENTS

| | | |
|---|---|---|
| JP | 2006-272420 A | 10/2006 |
| JP | 2007-311069 A | 11/2007 |
| JP | 2007-537574 A | 12/2007 |
| JP | 2008-43972 A | 2/2008 |
| JP | 2009-64593 A | 3/2009 |
| JP | 2009-187757 A | 8/2009 |
| JP | 2010-129289 A | 6/2010 |
| JP | 5304125 B2 | 7/2013 |

* cited by examiner

APPARATUS AND METHOD FOR PRODUCING FUEL CELL SEPARATOR ASSEMBLY

This application is a U.S. National stage application of International Application No. PCT/JP2014/060221, filed Apr. 8, 2014, which claims priority to Japanese Patent Application No. 2013-104421 filed in Japan on May 16, 2013. The entire disclosure of the Japanese Patent Application No. 2013-104421 is hereby incorporated herein by reference.

BACKGROUND

Field of the Invention

The present invention relates to an apparatus and method for manufacturing a fuel cell separator assembly.

Background Information

A fuel cell is configured primarily by layering a plurality of cells in which separators are arranged on both sides of a membrane electrode assembly. A fuel, an oxidizing agent, or the like for generating electricity must be distributed to the fuel cell, a sealing agent is applied to the external periphery of the membrane electrode assembly or the separators in order to seal the fuel or the oxidizing agent, and adjacent membrane electrode assemblies or separators are welded together. As an example configuration, adjoining separators of adjacent cells are welded together and configured as a separator assembly (see Japanese Laid-Open Patent Application No. 2009-187757). Another example is a technique in which catalyst layers are arranged and joined on both sides of an electrolyte membrane constituting a membrane electrode assembly. In this case, on one catalyst layer adjacent to the electrolyte membrane, an elastic body is arranged on the opposite side of the catalyst layer from the electrolyte membrane, and on the other catalyst layer adjacent to the electrolyte membrane, ultrasonic waves are applied from the opposite side of the catalyst layer from the electrolyte membrane (see Japanese Patent No. 5,304,125).

SUMMARY

Corrugations, the cross-sections of which are composed of a plurality of projections and recesses, are formed in a center part of the separators as channels for distributing the fuel or oxidizing agent. Electric power generated by the cells is transmitted by contact between the corrugations of the separators, and the state of contact of the projections and recesses of the corrugations affects resistance to conduction between cells. However, there are also variations in the height of the projections and recesses of the corrugations, and it is therefore difficult to being all of the projections and recesses into contact with each other. Therefore, in a configuration in which adjacent separators are layered and welded together as in Japanese Laid-Open Patent Application No. 2009-187757, problems arise in that projections of corrugations that are to be brought into contact with each other cannot be brought into adequate contact due to variations in the corrugations or variations in assembly of separators, and electrical resistance between cells is thereby increased.

The present invention was developed in order to overcome the abovementioned problems, and an object of the present invention is to provide an apparatus and method for manufacturing a fuel cell separator assembly whereby electrical resistance between cells can be satisfactorily suppressed.

In order to achieve the above objective, the present invention is a method for manufacturing a fuel cell separator assembly provided with a first separator and a second separator provided adjacent to a membrane electrode assembly and having uneven portions as fluid flow channels, a cross-sectional shape of the uneven portions including a plurality of projections and recesses. The manufacturing method described above has a joining step for bringing opposing projections of the uneven portions of the first separator and the second separator into contact with each other in a state in which a pressing force directed from the first separator side or the second separator side is imparted. The present invention is characterized in that an elastic member is interposed so that the pressing force directed from the first separator side or the second separator side is imparted, and the opposing projections are brought into contact with each other by elastic deformation of the elastic member in the joining step.

Another aspect of the present invention for achieving the abovementioned objects is an apparatus for manufacturing a fuel cell separator assembly provided with a first separator and a second separator provided adjacent to a membrane electrode assembly and having uneven portions as fluid flow channels, a cross-sectional shape of the uneven portions including a plurality of projections and recesses. The manufacturing apparatus described above is characterized by being provided with a pair of pressing members that approach and separate from each other and impart a pressing force directed from the first separator side and/or the second separator side, an elastic member for bringing opposing projections in the uneven portions of the first separator and the second separator into contact with each other, the elastic member being arranged between the first separator and either pressing member of the pair of pressing members, and a joining part for joining the first separator and the second separator.

BRIEF DESCRIPTION OF THE DRAWINGS

Referring now to the attached drawings which form a part of this original disclosure.

DETAILED DESCRIPTION OF THE EMBODIMENTS

Figure 1:
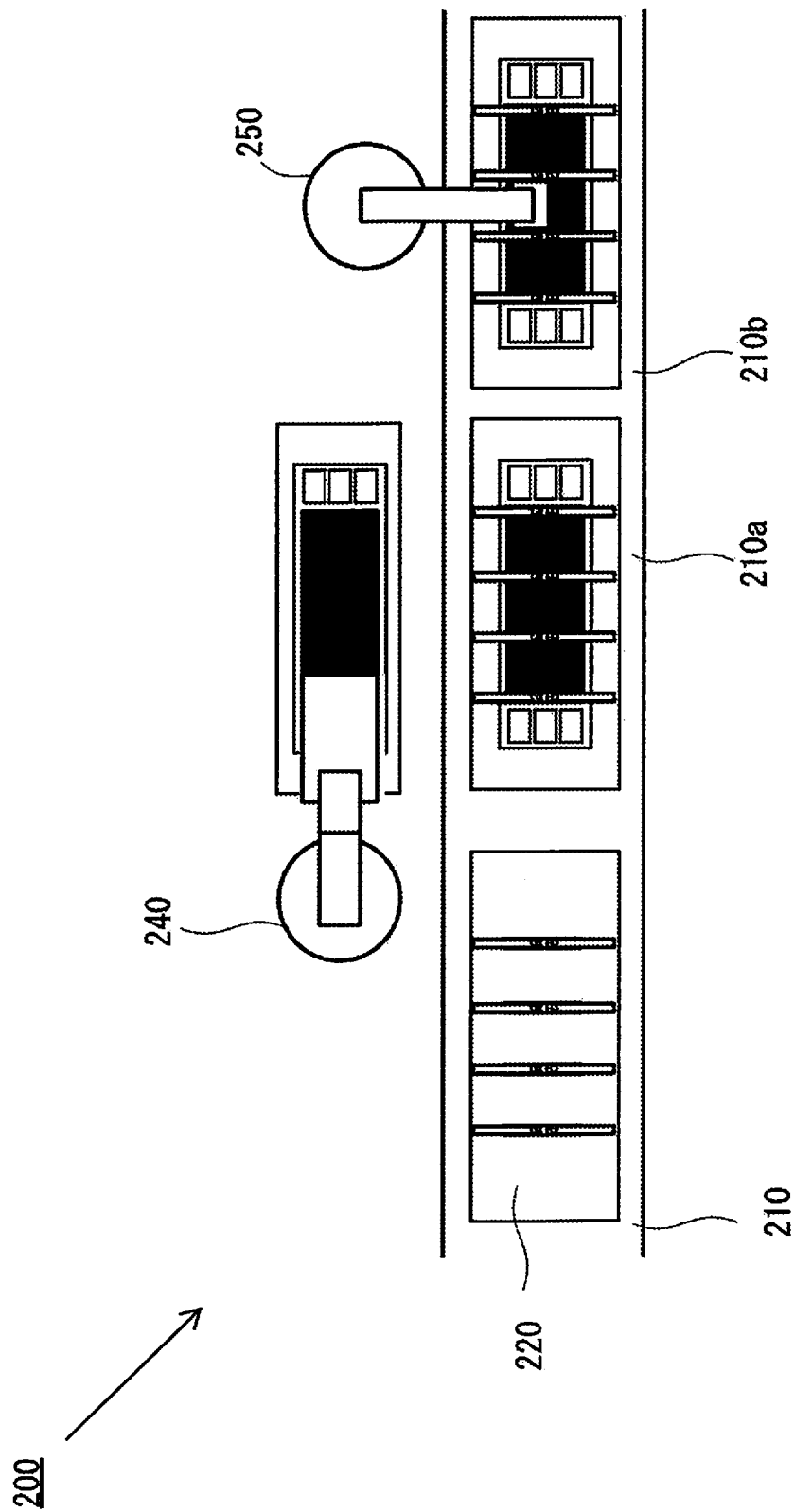
FIG. 1 is a schematic plan view of the apparatus for manufacturing a separator assembly constituting a fuel cell according to an embodiment of the present invention.

An embodiment of the present invention is described below with reference to the attached drawings. The description below is not given by way of any limitation of the technical scope or the meaning of terminology described in the claims. Additionally, the proportions in the drawings are exaggerated for convenience of explanation, and may differ from the actual proportions.

Figure 2:
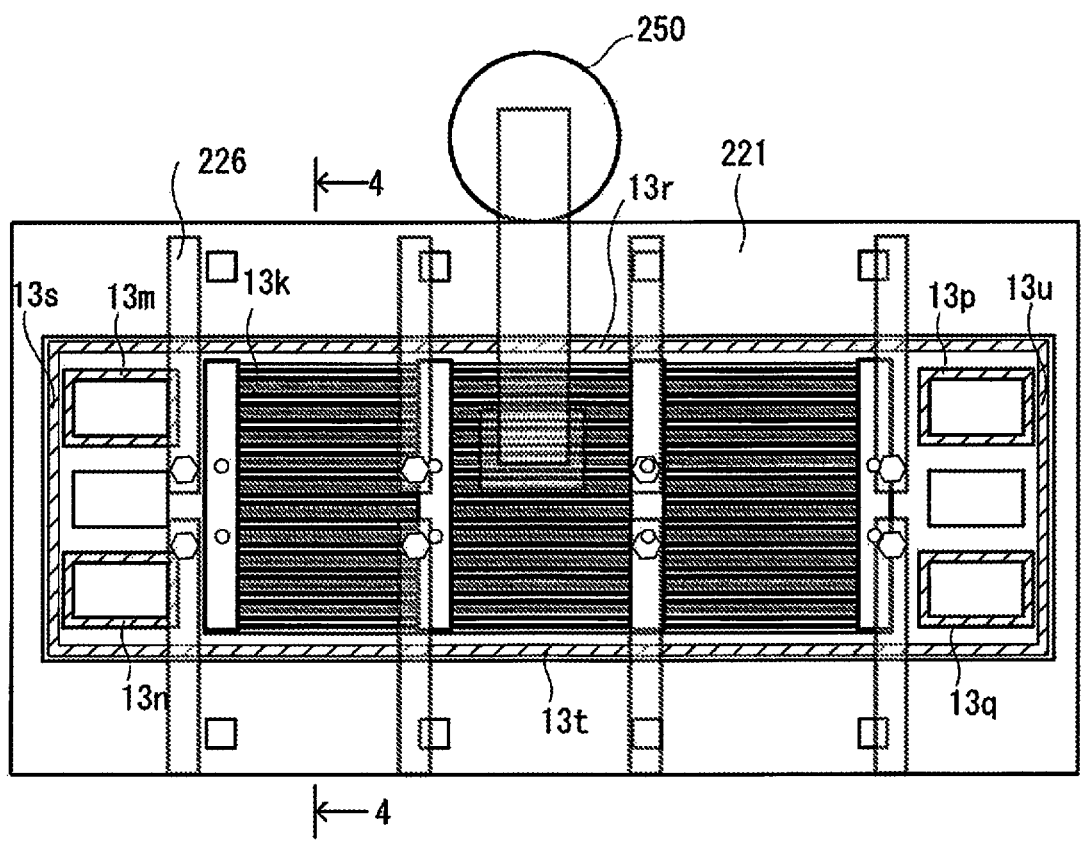
FIG. 2 is an enlarged plan view illustrating relevant parts of the manufacturing apparatus.
Figure 3:
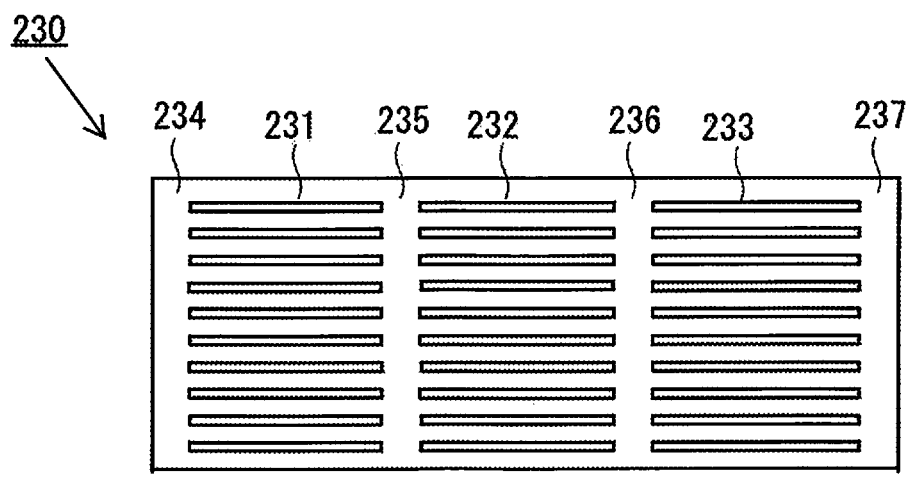
FIG. 3 is a plan view illustrating the elastic member used in the manufacturing apparatus.
Figure 4:
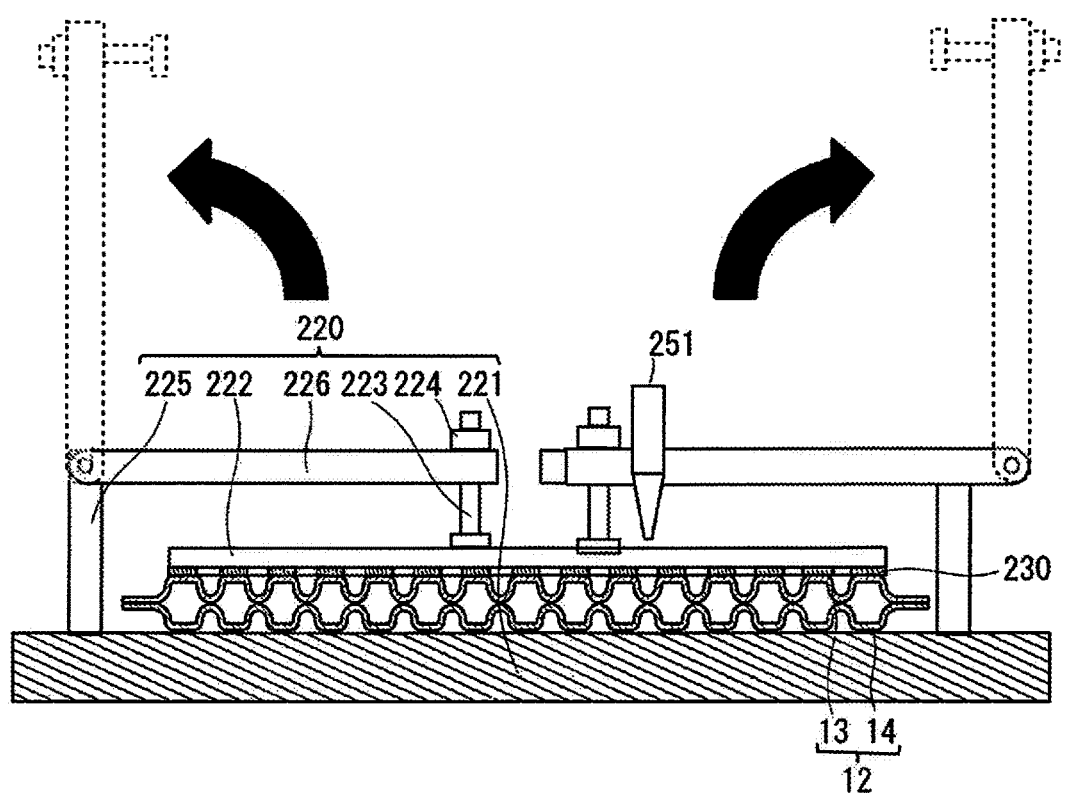
FIG. 4 is a sectional view as seen along section line 4-4 in FIG. 2.
Figure 5:
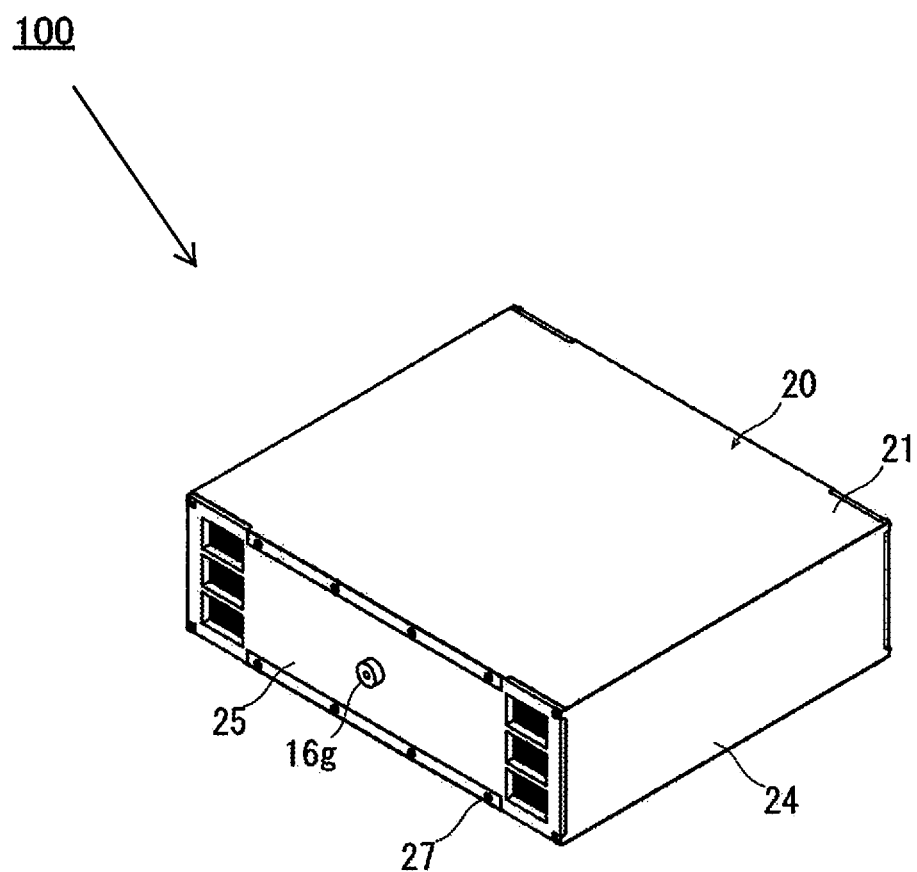
FIG. 5 is a perspective view illustrating the fuel cell according to the embodiment.
Figure 6:
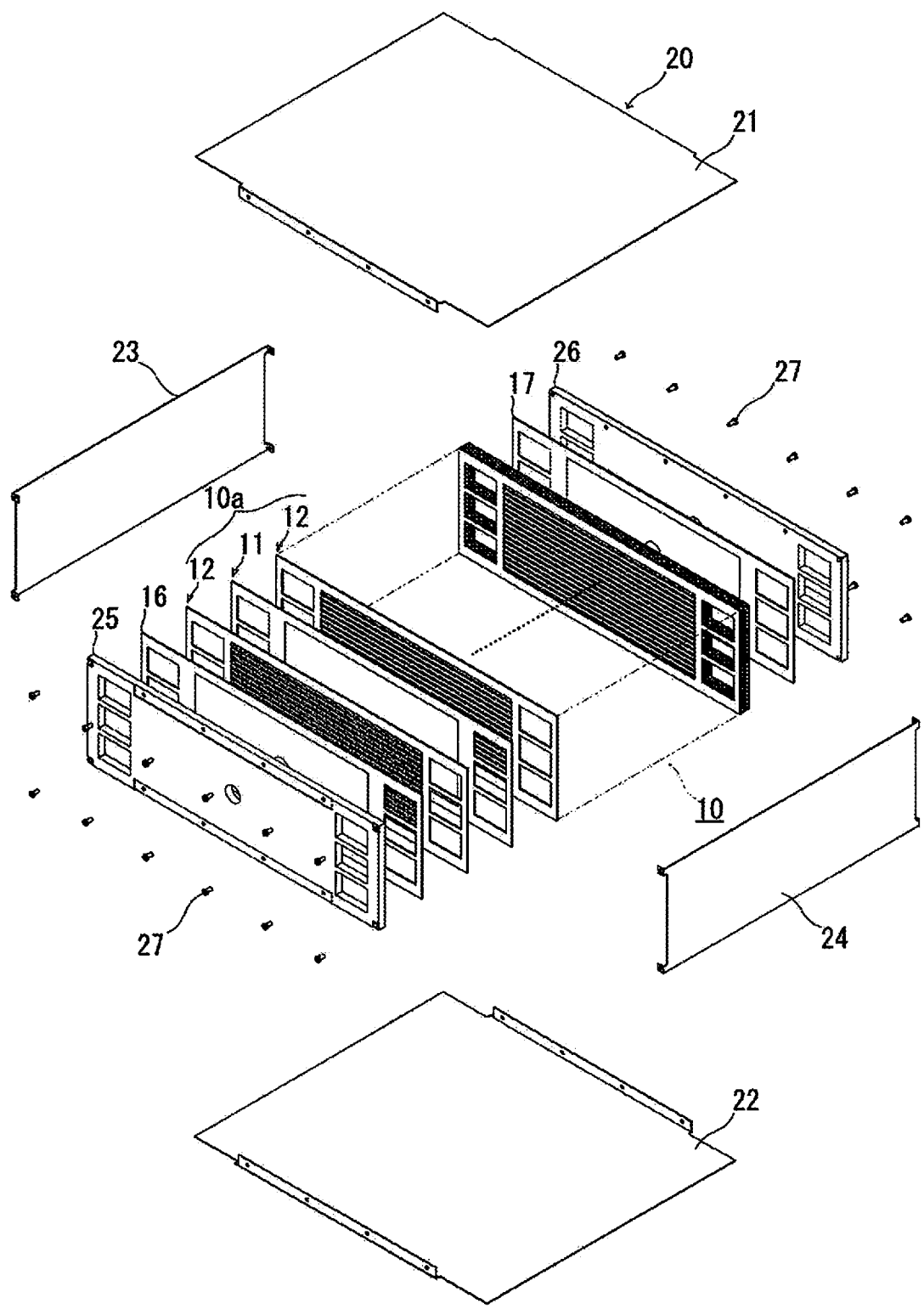
FIG. 6 is an exploded perspective view illustrating the configuration of the fuel cell.
Figure 7:
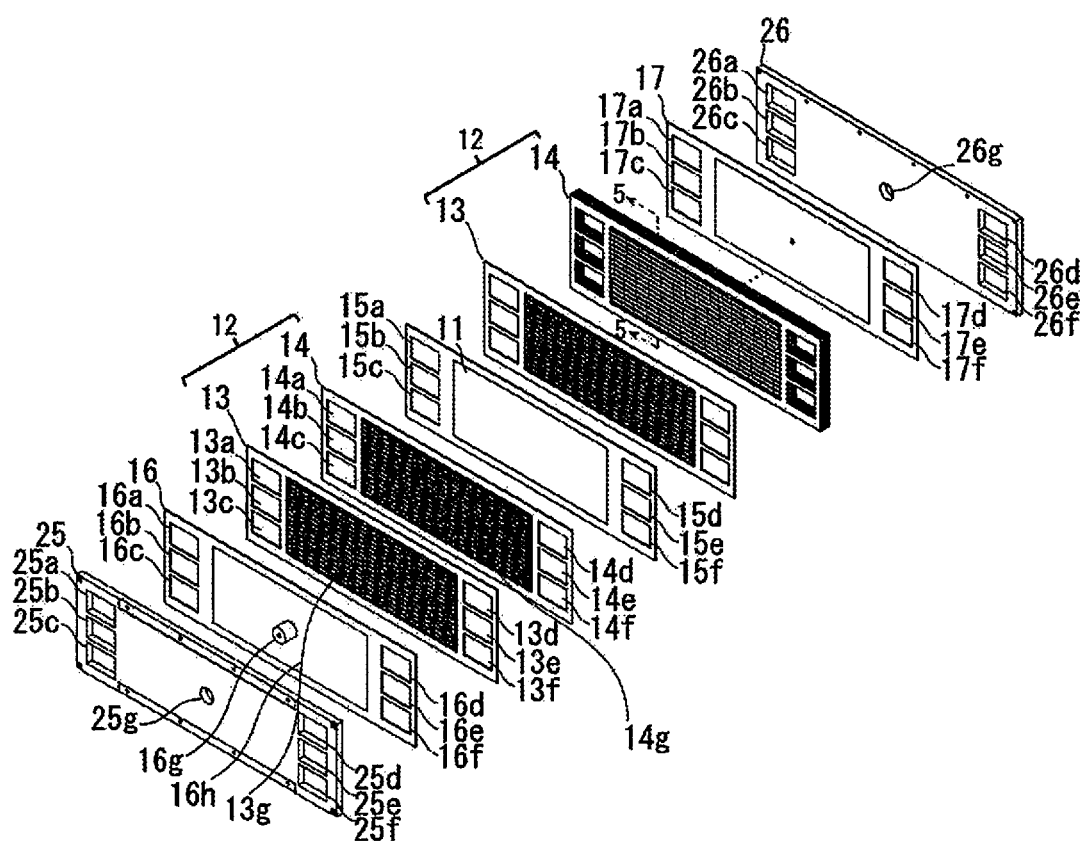
FIG. 7 is an exploded perspective view illustrating a portion of the fuel cell.
Figure 8:
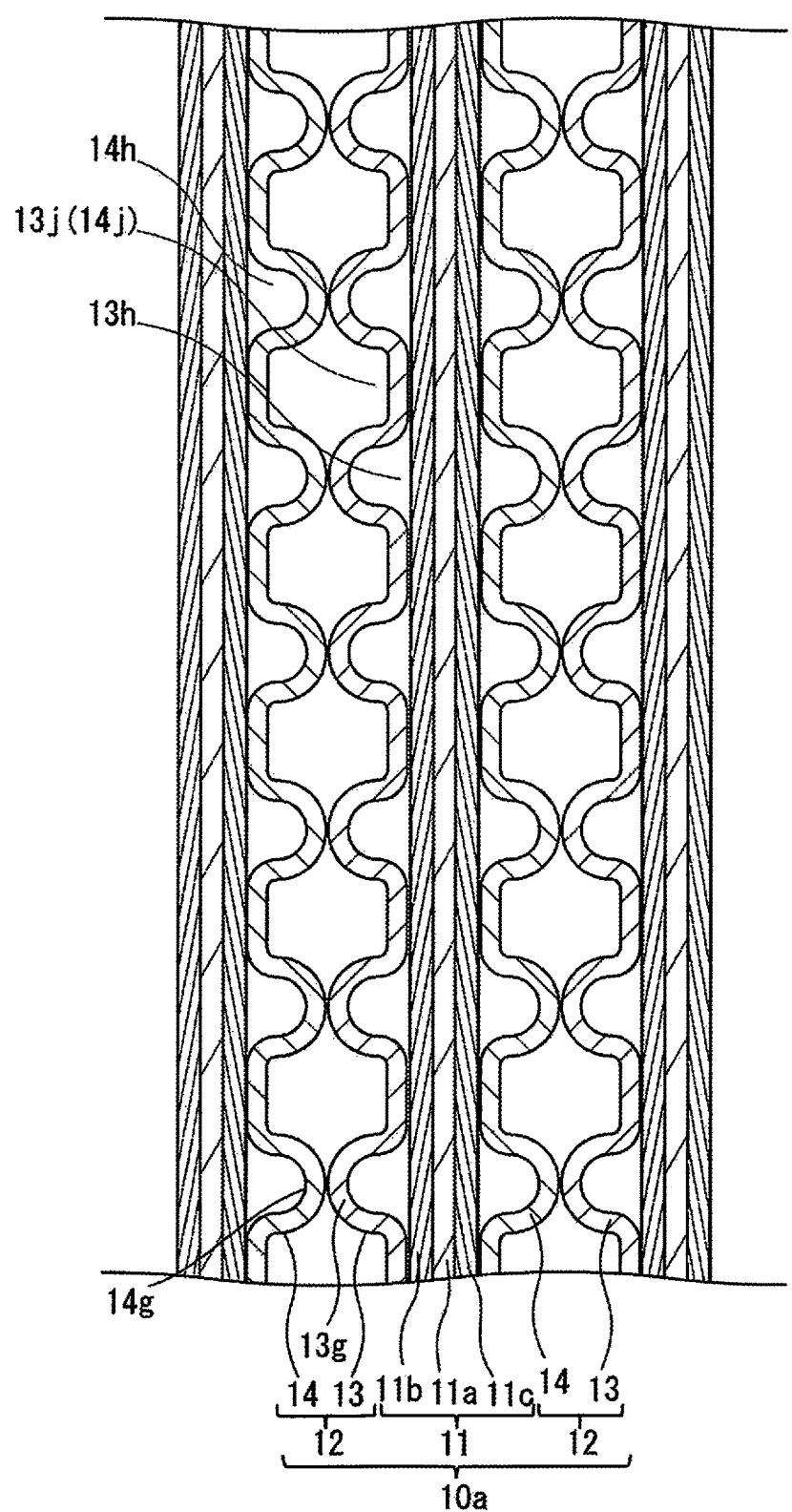
FIG. 8 is a sectional view illustrating the separator assembly and membrane electrode assembly according to the embodiment.

FIG. 1 is a schematic plan view illustrating the apparatus for manufacturing the separator assembly constituting the fuel cell according to an embodiment of the present invention, FIG. 2 is an enlarged plan view illustrating relevant parts of the manufacturing apparatus, FIG. 3 is a plan view illustrating the elastic member used in the manufacturing apparatus, and FIG. 4 is a sectional view along line 4-4 in FIG. 2. FIG. 5 is a perspective view illustrating the fuel cell according to an embodiment of the present invention, FIG. 6 is an exploded perspective view illustrating the configuration of the fuel cell, FIG. 7 is an exploded perspective view illustrating a portion of the fuel cell, and FIG. 8 is a sectional view illustrating the separator assembly and membrane electrode assembly of the fuel cell according to the embodiment.

In the present embodiment, a method and apparatus will be described for manufacturing a so-called separator assembly 12 composed of two separators 13, 14 arranged adjacent to a membrane electrode assembly 11 constituting a fuel cell 100. As illustrated in FIG. 4, the method for manufacturing the separator assembly 12 has a joining step for joining an anode-side separator 13 and a cathode-side separator 14. The separators 13, 14 have unevenly shaped corrugations 13$g$, 14$g$, and the corrugations 13$g$, 14$g$ are placed in contact and joined to each other using an elastic member 230 in the joining step. This process is described in detail below.

Fuel Cell

The fuel cell including the separator assembly will next be described. The fuel cell 100 has, as a main structural element, a layered body 10 in which a plurality of cells 10$a$ are layered. Each cell 10$a$ is configured so that a separator assembly 12 is arranged on each side of a membrane electrode assembly 11. In the membrane electrode assemblies 11, an anode 11$b$ is joined to one side of an electrolyte membrane 11$a$, and a cathode 11$c$ is joined to the other side thereof. Each separator assembly 12 has two separators 13, 14. Current collectors 16, 17 are provided at both ends in the layering direction of the layered body 10. The fuel cell 100 has a casing 20. The casing 20 has a pair of fastening plates 21, 22, a pair of reinforcing plates 23, 24, and a pair of end plates 25, 26. The manufacturing apparatus 200 for the fuel cell separator assembly 12 has, generally speaking, a conveyor 210; pressing members 220 for pressing the separator 13 toward the separator 14; an elastic member 230 for bringing opposing projections of the corrugations 13$g$, 14$g$ (corresponding to uneven portions) into contact with each other in the corrugations 13$g$, 14$g$, the cross-sections of which are composed of a plurality of projections and recesses, provided to the separators 13, 14, the elastic member being arranged between the pressing members 220 and the separator 13; a hand robot 240; and a welding robot 250 (corresponding to a joining part) for joining the separator 13 and the separator 14, as illustrated in FIGS. 1 through 4. The members included in the cells 10$a$ will next be described.

The separators 13, 14, shown in FIGS. 7 and 8, conduct electric power generated by adjoining membrane electrode assemblies 11 in the stacked plurality of fuel battery cells 10$a$ while separating the membrane electrode assemblies 11. The separators 13, 14 are classed as an anode-side separator 13 (corresponding to the first separator) and a cathode-side separator 14 (corresponding to the second separator). The anode-side separator 13 is brought into contact with the anode 11$b$ of the membrane electrode assembly 11. The anode-side separator 13 is made of a metal containing an electroconductive material, and is formed as a thin plate of larger configuration than that of the anode 11$b$.

As illustrated in FIGS. 7 and 8, in the center part of the anode-side separator 13, a corrugation 13$g$ in which a plurality of projections and recesses are formed at a constant interval is provided so as to constitute channels through which a fuel gas (hydrogen) and coolant water or another cooling fluid flow separately from each other. In the anode-side separator 13, closed spaces in the uneven shape which are formed by contact with the anode 11$b$ are used as anode gas channels 13$h$ for supplying hydrogen to the anode 11$b$. Meanwhile, in the anode-side separator 13, closed spaces formed between the corrugation 13$g$, the cross-section of which is composed of a plurality of uneven shapes, and the corrugation 14$g$ of the cathode-side separator 14 are used as cooling fluid channels 13$j$ (14$j$) for supplying coolant water.

The anode-side separator 13 comprises a longitudinal direction, and through-holes corresponding to a cathode gas supply port 13$a$, a cooling fluid supply port 13$b$, and an anode gas supply port 13$c$ are opened in one longitudinal-direction end of the anode-side separator 13. Similarly, through-holes corresponding to an anode gas discharge port 13$d$, a cooling fluid discharge port 13$e$, and a cathode gas discharge port 13$f$ are opened in the other longitudinal-direction end of the anode-side separator 13.

The cathode-side separator 14 comes into contact with the cathode 11$c$ of the membrane electrode assembly 11. The cathode-side separator 14 is made of a metal containing an electroconductive material, and is formed as a thin plate of larger configuration than that of the cathode 11$c$.

A cross-section in the center of the cathode-side separator 14, as shown in FIGS. 7 and 8, is provided with a corrugation 14$g$ comprising a plurality of irregular shapes so as to constitute a channel part for separating an oxidant gas (pure oxygen or air containing oxygen) and coolant water, the oxidant gas and coolant water passing therethrough. In the cathode-side separator 14, closed spaces in the uneven shape which are formed by contact with the cathode 11$c$ are used as cathode gas channels 14$h$ for supplying an oxidant gas to the cathode 11$c$. Meanwhile, in the cathode-side separator 14, closed spaces in the uneven shape which are formed between the cathode-side separator 14 and the anode-side separator 13 are used as cooling fluid channels 14$j$ (13$j$) for supplying coolant water.

The cathode-side separator 14 comprises a longitudinal direction, and through-holes corresponding to a cathode gas supply port 14$a$, a cooling fluid supply port 14$b$, and an anode gas supply port 14$c$ are opened in one longitudinal-direction end of the cathode-side separator 14. Similarly, through-holes corresponding to an anode gas discharge port 14$d$, a cooling fluid discharge port 14$e$, and a cathode gas discharge port 14$f$ are opened in the other longitudinal-direction end of the cathode-side separator 14. The separator 14 is joined to the separator 13, and supply ports 14$a$ through 14$c$ and discharge ports 14$d$ through 14$f$ thereof are communicated with supply ports 13$a$ through 13$c$ and discharge ports 13$d$ through 13$f$ of the separator 13.

The membrane electrode assembly 11, shown in FIG. 12, causes the supplied oxygen and hydrogen to chemically react in order to produce electric power. The membrane electrode assembly 11 is formed by joining the anode 11$b$ to one side of the electrolyte membrane 11$a$ and joining the cathode 11$c$ to the other side. The membrane electrode assembly 11 is typically referred to as an "MEA." The electrolyte membrane 11a is made of, e.g., a solid polymer material, and is formed in a thin-plate shape. One example of the material used as the solid polymer material is a fluorine-based resin that conducts hydrogen ions and has excellent electrical conduction properties while in a wet state. The anode 11b is configured by stacking an electrode catalyst layer, a water-repellent layer, and a gas diffusion layer, the anode 11b being formed in a thin-plate shape slightly thinner than the electrolyte membrane 11a. The cathode 11c is configured by stacking an electrode catalyst layer, a water-repellent layer, and a gas diffusion layer, the cathode 11c being formed in a thin-plate shape of the same size as the anode 11b. The electrode catalyst layers in the anode 11b and cathode 11c contain an electrode catalyst in which a catalyst component is supported on an electroconductive carrier, and a polymeric electrolyte. The gas diffusion layers in the anode 11b and cathode 11c are formed from, e.g., carbon cloth, carbon paper, or carbon felt woven using fibers comprising carbon fiber filaments having sufficient diffusion properties and electroconductivity.

The MEA 11 comprises a frame member 15. The frame member 15 integrally holds the outer periphery of the stacked electrolyte membrane 11a, anode 11b, and cathode 11c. The frame member 15 comprises, e.g., an electrically insulated resin, and is formed in a contour similar to that of the outer-peripheral portion of the separators 13, 14. Through-holes corresponding to a cathode gas supply port 15a, a cooling fluid supply port 15b, and an anode gas supply port 15c are opened in one longitudinal-direction end of the frame member 15. Similarly, through-holes corresponding to an anode gas discharge port 15d, a cooling fluid discharge port 15e, and a cathode gas discharge port 15f are opened in the other longitudinal-direction end of the frame member 15.

It is necessary to stack together a plurality of the fuel battery cells 10a described above in a tightly sealed state. Therefore, the MEA 11, the separator 13, and the separator 14 in each of the layered cells 10a are sealed together by applying a sealing member to the external periphery thereof. One example of the material used in the sealing member is a thermosetting resin. The thermosetting resin is selected from, e.g., phenol resin, epoxy resin, and unsaturated polyester. Adjoining separators 13 and separators 14 in the layered cells 10a are also sealed by welding the external periphery or the like of the separators 13, 14 as described below. However, this sealing may also be accomplished by applying a sealing member in the same manner as between the MEA 11 and the separators 13 or separators 14.

The current collectors 16, 17, shown in FIGS. 6 and 7, draw out the electric power produced by the fuel battery cells 10a to the outside.

The current collectors 16, 17 are respectively disposed on the two ends of the stack 10 in which the plurality of fuel battery cells 10a are stacked. The external shape of the current collectors 16, 17 is, except for a portion of the shape, the same as that of the frame member 15 of the MEA 11 having a slightly greater layer thickness. Through-holes corresponding to a pair of cathode gas supply ports 16a, 17a, a pair of cooling fluid supply ports 16b, 17b, and a pair of anode gas supply ports 16c, 17c are opened in one longitudinal-direction end of the pair of current collectors 16, 17. Similarly, through-holes corresponding to a pair of anode gas discharge ports 16d, 17d, a pair of cooling fluid discharge ports 16e, 17e, and a pair of cathode gas discharge ports 16f, 17f are opened in the other longitudinal-direction end. A current collecting part 16h (the same for the current collector 17) is provided in the center of the current collectors 16, 17.

The current-collecting parts 16h, etc. of the current collectors 16, 17 comprise, e.g., an electroconductive member such as dense carbon that does not transmit gas, the current-collecting parts 16h, etc. being formed in a thin-plate shape slightly smaller than the contours of the anode 11b and cathode 11c. The current-collecting parts 16h, etc. come into contact with the anode 11b or cathode 11c of the MEA 11 provided to the outermost layer of the plurality of stacked fuel battery cells 10a. A cylindrical, electroconductive protruding part 16g, etc. is provided so as to protrude from one surface of each of the current-collecting parts 16h, etc. The protruding parts 16g, etc. are inserted through through-holes 25g, etc. in the end plates 25, 26 of the casing 20 described later, the protruding parts 16g, etc. facing outward. A shape corresponding to the protruding part 16g of the current collector 16 is similarly provided on the current collector 17.

The casing 20, shown in FIGS. 5 and 6, holds together the plurality of stacked fuel battery cells 10a and the pair of current collectors 16, 17 in a tightly sealed state.

The casing 20 includes the pair of fastening plates 21, 22, the reinforcing plates 23, 24, and the end plates 25, 26 as described above, as well as screw 27. The members included in the casing 20 will be described below.

The end plates 25, 26 hold therebetween and urge the current collectors 16, 17 disposed on the two ends of the stacked plurality of fuel battery cells 10a. The end plates 25, 26 are similar in contour to the slightly thicker MEA 11 in all but one region. The end plates 25, 26 are made of, e.g., metal, an insulating body being provided to a portion that comes into contact with the current collectors 16, 17.

Through-holes corresponding to a pair of cathode gas supply ports 25a, 26a, a pair of cooling fluid supply ports 25b, 26b, and a pair of anode gas supply ports 25c, 26c are opened in one longitudinal-direction end of the end plates 25, 26. Similarly, through-holes corresponding to a pair of anode gas discharge ports 25d, 26d, a pair of cooling fluid discharge ports 25e, 26e, and a pair of cathode gas discharge ports 25f, 26f are opened in the other longitudinal-direction end.

The cathode gas supply ports 13a through 17a and 25a, 26a, the cooling fluid supply ports 13b through 17b and 25b, 26b, the anode gas supply ports 13c through 17c and 25c, 26c, the anode gas discharge ports 13d through 17d and 25d, 26d, the cooling fluid discharge ports 13e through 17e and 25e, 26e, and the cathode gas discharge ports 13f through 17f and 25f, 26f of the separators 13, 14, the frame member 15, the current collectors 16, 17, and the end plates 25, 26, respectively, are configured so as to be communicated when the separators 13, 14, the MEA 11, the current collectors 16, 17, and the end plates 25, 26 are aligned. The end plates 25, 26 has through-holes 25g, 26g through which protruding parts 16g of the current collectors 16, 17 described above are inserted.

The fastening plates 21, 22 are composed of a metal, for example, and formed so as to be plate shaped. The fastening plates 21, 22 are formed so that edge parts thereof are partially upright and come in contact with surfaces of the end plates 25, 26 when assembled. Holes for inserting screws 27 are provided in the surfaces of the fastening plates 21, 22 that contact the end plates 25, 26, and the end plates 25, 26, the current collectors 16, 17, and the layered body 10 are compressed in the layering direction by tightening of the screws 27 installed in the holes. The reinforcing plates 23, 24 are composed of a metal, for example, and formed so as to be plate shaped and narrower than the fastening plates 21, 22. The reinforcing plates 23, 24 are formed so that end parts thereof in the longitudinal direction are partially upright, and holes for inserting screws 27 are provided in the upright portions. The holes are formed so that the screws 27 pass through in the layering direction, and by installing and tightening the screws 27, the end plates 25, 26, the current collectors 16, 17, and the layered body 10 are compressed in the layering direction in the same manner as by the fastening plates 21, 22. The fastening plates 21, 22 and the reinforcing plates 23, 24 thus compress the end plates 25, 26, the current collectors 16, 17, and the layered body 10 in the layering direction by the tightening of the screws 27.

Manufacturing Apparatus for Manufacturing Separator Assembly

The manufacturing apparatus for manufacturing a separator assembly according to the present embodiment will next be described. The manufacturing apparatus 200 for a separator assembly 12 according to the present embodiment has the conveyor 210, the pressing members 220, the elastic member 230, the hand robot 240, and the welding robot 250.

The conveyor 210 conveys a stage 221 on which the separators 13, 14 are loaded to from left to right in FIG. 1 and sends the stage 221 to the next step. Stop positions 210a, 210b are provided in the conveyor 210 for assembling a separator assembly.

The pressing members 220 have the stage 221 and pressing bars 222 which approach and separate from each other, pressing pins 223, nuts 224, support columns 225, and arms 226.

The separators 13, 14 constituting the separator assembly 12 are loaded on the stage 221, and joining of the separators 13, 14 is performed on the stage 221. The stage 221 is configured having a rectangular shape larger than the surface area of the separators 13, 14, but the shape of the stage 221 is not limited to being rectangular. The pressing bars 222, the pressing pins 223, the nuts 224, the support columns 225, and the arms 226 constituting the pressing members 220 are provided on the stage 221. The stage 221 acts as a receiving member when the pressing bars 222 press the separator 13 toward the separator 14.

The elastic member 230 is arranged between the pressing bars 222 and the separator 13 as described below, and absorbs variations in the corrugations 13g, 14g of the separators 13, 14, whereas the stage 221 is configured from stainless steel or another rigid material. Configuring the stage 221 from a more rigid material than the elastic member 230 in this manner makes it possible to prevent the joined portions of the separators 13, 14 from becoming distorted by the elastic deformation of the elastic member 230 also when the elastic member 230 is arranged between the pressing bars 222 and the separator 13. This configuration also makes it possible to prevent a decrease in power generation characteristics of the fuel cell due to inadequate contact with the MEA 11 as a result of distortion of the shape of the separator assembly 12 manufactured by the method of the present embodiment.

The support columns 225 are provided as pairs at an end part of the stage 221 as illustrated in FIG. 4. The arms 226 are connected to the support columns 225 so as to be able to rotate. Placing the arms 226 in an open state as indicated by dotted lines in FIG. 4 makes it possible to convey in and mount the separators 13, 14 on the stage 221.

The pressing pins 223 are attached to each of the arms 226 at the opposite end thereof from the point of attachment of the support columns 225. The pressing pins 223 are screwed together with the nuts 224 and are thereby fixed so that the amount of protrusion thereof from one side of the arms 226 is adjustable.

The pressing bars 222 receive a pressing force from the pressing pins 223 and approach/separate from the stage 221, and impart a pressing force to the separator 13 via the elastic member 230. The pressing bars 222 are also connected to the pressing pins 223 provided as a pair. Therefore, during mounting of the separators 13, 14 on the stage 221, each pressing bar 222 separates from the pressing pins 223 thereof, or after the separators 13, 14 are loaded on the stage 221 in a state in which each pressing bar 222 is connected to only one of the pair of pressing pins 223, the pressing bar 222 becomes connected to both of the pair of pressing pins 223.

The hand robot 240 is an articulated robot, and a hand mechanism for grasping a component is provided at a distal end thereof. The hand robot 240 grasps a component through use of the hand mechanism, and moves the separators 13, 14 by rotation of joint portions to the stage 221 and mounts the separators 13, 14 thereon.

A welding head 251 is attached to a distal end of the welding robot 250. The welding robot 250 welds the separators 13, 14 by laser radiation, but the method of welding is not limited to a laser insofar as the elastic member 230 is mounted between the pressing bars 222 and the separator 13.

The separator 13 and the separator 14 are joined together by is performed by partially welding in irregular sections 13k that constitute corrugations 13g along the direction in which the cross-sectional shape of the irregularities extends, as illustrated in FIG. 2. Also, the joining of the separator 13 and the separator 14 is also performed by welding at the edge part 13m of the cathode gas supply port 13a, the edge part 13n of the anode gas supply port 13c, the edge part 13p of the anode gas discharge port 13d, the edge part 13q of the cathode gas discharge port 13f, and the four sides 13r, 13s, 13t, 13u that form the contour of the separator 13. In FIG. 2, the arms 226 and the welding robot 250 are illustrated as partially transparent in order to indicate the weld locations, and the elastic member 230 is omitted.

The elastic member 230 receives the pressing force from the pressing bars 222 and increases the number of projections in contact with each other among the opposing projections of the corrugations 13g, 14g of the separators 13, 14. The elastic member 230 has slits 231 through 233 (corresponding to joining regions) provided so that the separators 13, 14 can be welded by the welding robot 250, and bar loading parts 234 through 237 (corresponding to pressing regions) as portions contacted by the pressing bars 222 of the pressing members 220.

The slits 231 through 233 are provided so that the laser of the welding robot 250 can pass through the elastic member 230 and irradiate the separator 13. As illustrated in FIGS. 2 and 3, the slits 231 through 233 are provided so as to correspond to the weld locations of the separators 13, 14, and ten rows thereof are provided in the present embodiment, although this number is not limiting. The slits 231 through 233 are formed so as to extend in the same direction as the projections and recesses of the corrugations 13g, 14g of the separators 13, 14 extend when the slits are placed over the separator 13, and three divisions of slits are provided in the direction in which the projections and recesses extend in the present embodiment.

The bar loading parts 234 through 237 are provided so as to correspond to the locations where the pressing bars 222 of the pressing members 220 are loaded. As illustrated in FIG.

2, the pressing bars 222 press on portions of the corrugations 13g, 14g, and it is not necessary for the entire area of the corrugations 13g, 14g to be pressed in order to cause the projections of the corrugations 13g, 14g to contact each other. The bar loading parts 234 through 237 therefore also do not cover the entire area of the corrugations 13g, 14g, and using a portion of this area for the bar loading parts makes it possible to provide the slits 231 through 233 necessary for welding. The projections can thereby be joined together in a state in which the interposed elastic member 230 increases the number of projections of the corrugations 13g, 14g that are in contact with each other.

The elastic member 230 is configured from an elastomer, such as nitrile rubber (NBR), for example. Configuring the elastic member 230 from a material exhibiting a restorative force makes it possible to absorb variations in height among opposing projections of the corrugations 13g, 14g of the separators 13, 14 and increase the number of projections that are in contact with each other.

MANUFACTURING METHOD FOR MANUFACTURING SEPARATOR ASSEMBLY

The method for manufacturing the separator assembly according to the present embodiment will next be described. The method for manufacturing the separator assembly 12 has a joining step for joining the separators 13, 14 using the manufacturing apparatus 200.

When the stage 221 is conveyed to the position 210a by the conveyor 210, the arms 226 are rotated by a control unit not illustrated in the drawings and opened upward (see the dotted lines in FIG. 4). In this state, the hand robot 240 grasps the separators 13, 14 from a component storage location not illustrated in the drawings, conveys the separators 13, 14 to the stage 221, and mounts the separators 13, 14 thereon. In the present embodiment, the separator 14 is mounted first, and the separator 13 is then aligned and mounted thereon, but the positioning of the separators may also be reversed.

Once the separators 13, 14 are mounted on the stage 221, the elastic member 230 is aligned and mounted on the separator 13 so that the slits 231 through 233 coincide with welding locations 13k on the separators 13, 14. The arms 226 are then rotated about 90 degrees from the state indicated by dotted lines in FIG. 4 to the state indicated by solid lines.

The pressing bars 222 are then attached to the pressing pins 223, the amount of screwing together with the nuts 224 is adjusted, the pressing bars 222 are placed in contact with the separator 13 while being aligned therewith, and a pressing force is imparted. When a predetermined pressing force has been imparted, the welding head 251 of the welding robot 250 is arranged at the head of any of the slits 231 through 233 of the elastic member 230, and welding is performed. The separator assembly 12 is thereby completed.

When the separator assembly 12 is completed, a separator assembly 12 is arranged on both sides of the MEA 11, the sealing member is applied to form a cell 10a, and a predetermined number of cells 10a are layered while the sealing member is applied therebetween to form a layered body 10. The current collectors 16, 17 are then arranged on both ends of the layered body 10, the fastening plates 21, 22, reinforcing plates 23, 24, and end plates 25, 26 are attached, and a pressing load is imparted thereto from the layering direction of the layered body 10 by the screws 27, and the fuel cell 100 is thereby completed.

The operation and effect of the present embodiment will next be described. The corrugations having a cross-section composed of projections and recesses formed in the center part of the separators are assumed to function as channels for passing fuel, an oxidizing agent, or the like, and opposing projections in the corrugations are brought into contact to conduct electricity. The state of contact between projections therefore affects resistance to conduction between cells. Adjacent separators are sometimes welded at opposing projection portions in the corrugations as well, but because there are also variations in the shape of the projections, it is difficult to bring all of the projections of the corrugations into contact with each other, and when joining is inadequate due to variations in the projections, there is risk of the power generation characteristics of the fuel cell being affected by increased resistance to conduction between cells.

However, the manufacturing method and manufacturing apparatus 200 are configured for a separator assembly 12 according to the present embodiment so that the elastic member 230 for bringing the opposing projections of the corrugations 13g, 14g into contact with each other by elastic deformation is interposed between the separator 13 and the pressing bars 222 for imparting pressing force to the separator 13 in the step for joining the separators 13, 14. Variations in the corrugations 13g, 14g are therefore absorbed, the number of projections in contact with each other can be increased, and joining can be performed with an increased number of projections in contact with each other. The resistance to conduction (electrical resistance) between cells can thereby be satisfactorily suppressed using a separator assembly manufactured by the manufacturing method or manufacturing apparatus 200 according to the present embodiment.

The elastic member 230 has slits 231 through 233 for the welding together of opposing projections in the corrugations 13g, 14g of the separators 13, 14 by the welding robot 250, and bar loading parts 234 through 237 for imparting pressing force from the pressing bars 222 of the pressing members 220. Welding by the welding robot 250 is therefore performed while the pressing force from the pressing bars 222 is imparted via the elastic member 230, and the welding can thereby be performed in a state in which the number of opposing projections of the corrugations 13g, 14g in contact with each other is increased.

The stage 221, acting as a receiving member for the pressing bars 222 and arranged on the opposite side of the elastic member 230 from the pressing bars 222, is configured from a material less readily deformed by an external force than the elastic member 230. It is therefore possible to prevent the joined portions of the separators from becoming distorted when variations in the corrugations 13g, 14g are absorbed by the elastic member 230. This configuration also makes it possible to prevent a decrease in power generation characteristics of the fuel cell due to inadequate contact between the MEA 11 and the separator assembly 12 constituting the layered body 10 as a result of distortion of the shape of the separator assembly 12.

The present invention is not limited to the embodiment described above; various modifications within the scope of the claims can be applied.

In the embodiment described above, the elastic member 230 is mounted between the separator 13 and the pressing bars 222 constituting the pressing members 220, but the present invention is not limited to this configuration. The elastic member 230 may also be mounted between the separator 14 and the stage 221 for acting as a receiving member. In the embodiment described above, the stage 221 acts as a receiving member with respect to the pressing bars 222, but this configuration is not limiting, and a configuration may also be adopted in which the stage 221 moves together with the pressing bars 222 towards the pressing bars 222 and imparts a pressing force to the separators 13, 14.

The invention claimed is:

1. A manufacturing method for manufacturing a fuel cell separator assembly provided with a first separator and a second separator that is provided adjacent to a membrane electrode assembly, and the first and second separators having uneven portions as fluid flow channels, a cross-sectional shape of the uneven portions comprising a plurality of projections and recesses; the manufacturing method comprising:

performing a joining step for bringing opposing projections of the uneven portions of the first separator and the second separator into contact with each other in a state in which a pressing force is imparted to the first separator or the second separator without the membrane electrode assembly being disposed adjacent the first separator or the second separator;

interposing an elastic member to contact the first separator or the second separator so that the pressing force is imparted to the first separator or the second separator, and the opposing projections are brought into contact with each other by elastic deformation of the elastic member in the joining step.

2. The manufacturing method according to claim 1, wherein the joining of the first separator and the second separator in the joining step being performed in joining regions provided to the elastic member while the pressing force is applied to pressing regions provided to the elastic member.

3. The manufacturing method according to claim 1, wherein providing a rigid material on an opposite side from a side on which the elastic member is interposed, the rigid material deforming less readily than the elastic member, and the pressing force being imparted to the first separator or the second separator in the joining step.

4. The manufacturing method according to claim 2, wherein providing a rigid material on an opposite side from a side on which the elastic member is interposed, the rigid material deforming less readily than the elastic member, and the pressing force being imparted to the first separator or the second separator in the joining step.

* * * * *